United States Patent
Kim et al.

(10) Patent No.: US 8,216,711 B2
(45) Date of Patent: Jul. 10, 2012

(54) BATTERY PACK

(75) Inventors: Jin Wook Kim, Seoul (KR); Dong Gun Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 330 days.

(21) Appl. No.: 12/624,520

(22) Filed: Nov. 24, 2009

(65) Prior Publication Data

US 2011/0059345 A1    Mar. 10, 2011

(30) Foreign Application Priority Data

Sep. 7, 2009    (KR) .................. 10-2009-0083767

(51) Int. Cl.
*H01M 2/10* (2006.01)
*H01M 10/50* (2006.01)
*H01M 6/42* (2006.01)

(52) U.S. Cl. .................... 429/120; 429/156; 429/159

(58) Field of Classification Search .................. 429/120, 429/156, 159
See application file for complete search history.

(56) References Cited

U.S. PATENT DOCUMENTS

2007/0081356 A1 *   4/2007   Lee et al. ............... 362/561
2007/0126396 A1 *   6/2007   Yang ....................... 320/112

FOREIGN PATENT DOCUMENTS

| JP | 2009-043578 | 2/2009 |
|---|---|---|
| KR | 10-2006-0072922 | 6/2006 |
| KR | 10-2006-0102207 | 9/2006 |
| KR | 10-2007-0057344 | 6/2007 |
| KR | 10-2009-0043429 | 5/2009 |

* cited by examiner

*Primary Examiner* — Gregg Cantelmo
(74) *Attorney, Agent, or Firm* — Edwards Wildman Palmer LLP; Peter F. Corless

(57) ABSTRACT

The present invention features a battery pack, that is provided to supply electricity to a variety of electric parts, such as a drive motor, installed in an environment friendly electric vehicle such as a fuel cell vehicle or a hybrid electric vehicle. Preferably, the battery pack is configured to stack cell assemblies. Each cell assembly includes a cell case. The cell case includes windows in opposite surfaces thereof such that unit cells are exposed, and recesses in opposite long lateral faces thereof such that the windows communicate with an outside. The windows and the recesses define cooling passages between the stacked cell assemblies.

3 Claims, 6 Drawing Sheets

BATTERY PACK

CROSS-REFERENCE TO RELATED APPLICATION

This application claims under 35 U.S.C. §119(a) the benefit of Korean Patent Application No. 10-2009-0083767 filed Sep. 7, 2009, the entire contents of which are incorporated herein by reference.

BACKGROUND (a) Technical Field

The present disclosure relates, generally, to a battery pack. More particularly, the present invention relates to a battery pack having cell assemblies, each of which preferably contains unit cells therein.

(b) Background

Environment friendly electric vehicles, such as fuel cell vehicles or hybrid electric vehicles, are preferably equipped with batteries for suitably supplying electricity to various high-voltage parts including a drive motor. Preferably, each battery includes a plurality of unit cells, which are secondary cells, and that repeat charge/discharge during operation of the vehicle, and suitably supply electricity to high-voltage parts of the vehicle.

A typical high-voltage battery for the fuel cell vehicles supplies electricity both to elements (e.g. a blower) of a fuel cell system and to a variety of high-voltage parts, and suitably stores electricity that is generated by fuel cells or by a drive motor (during a regenerative braking mode).

In general, a typical high-voltage battery for the hybrid electric vehicles supplies electricity to a variety of high-voltage parts, such as a drive motor, and suitably stores electricity generated by the drive motor.

Preferably, each battery, which is suitably mounted on the electric vehicles and is used as chargeable/dischargeable electricity accumulating means, is provided in the form of a battery pack. Further, the battery pack is preferably configured to receive a plurality of cells in a case to suitably form a cell cartridge (or a cell assembly), modularize the cell cartridge and thereby form a unit module, and suitably stack a plurality of unit modules.

Preferably, this vehicle battery pack is subject to an increase in temperature which occurs during use, so that the battery pack is preferably designed with ventilation and cooling taken into consideration. When the temperature of the battery pack is suitably increased, charge/discharge efficiency thereof is suitably reduced. Further, when the temperatures of the cells of the battery pack are out of balance, the life span of the cells is suitably reduced. Accordingly, it is necessary to provide a technique for suitably maintaining the temperature of the battery pack within a range where the battery pack can produce optimal performance, by arranging the cell cartridges at appropriate intervals.

Preferably, in this battery pack, each cell cartridge is suitably configured to stack a plurality of cells in a cell case, and each unit module is suitably configured to stack the cell cartridges in a module case so as to be spaced apart from each other. Then, the unit modules are stacked.

Preferably, it is further required to secure a cooling passage for the cells received in each cell cartridge. Accordingly, the cell cartridges are suitably assembled spaced apart from each other using a specific part.

Preferably, the part used for holding the cells in respective cell cartridges includes a first outer frame, a middle frame and a second outer frame. To form the cooling passages into a unit module, the cell cartridges are suitably installed in the unit module such that the unit cells are interposed between the first outer frame and the middle frame and between the middle frame and the second outer frame.

Preferably, when cell cartridges are fabricated into a unit module, it is may be further required to define the cooling passages between the cell cartridges in the unit module, so that, in the prior art, separators are further required for spacing the cell cartridges from each other. However, the use of the separators in the unit module increases the volume of the unit module and the volume of the battery pack.

Further, because the conventional battery pack must be provided with the middle frame for reinforcing the strength at positions between the unit cells, the conventional battery pack has an increased volume of the cell cartridges, an increased volume of the unit modules and an increased volume of the battery pack, the battery pack has a complicated structure, and furthermore the number of parts and the production cost thereof are increased.

Accordingly, in the conventional battery pack, it is considerably difficult to directly produce a battery pack using the cell cartridges, but it is required to fabricate the cell cartridges into a unit module.

Accordingly, to produce the conventional battery pack, a plurality of unit cells (typically, a pair of unit cells) are suitably assembled with a frame, thus forming one cell cartridge. Further, a plurality of cell cartridges are produced in the same manner and the cell cartridges are fabricated into a unit module. A plurality of unit modules are stacked, thus producing a battery pack. Accordingly, the conventional battery pack is suitably produced through many processes. Accordingly, assembling efficiency and productivity are suitably reduced, and assembly time, the number of processes, and the cost of production are suitably increased.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a battery pack having a suitable cell case structure, in which a plurality of cell assemblies can be directly stacked without fabricating the cell cartridges into a unit module, thus easily producing a battery pack. In certain preferred embodiments, the present invention is directed toward providing a suitable cell case structure, in which the cooling passages are naturally defined without the cell assemblies being suitably separated from each other.

In particular preferred embodiments, the present invention is directed toward providing a cell assembly and a battery pack, which preferably have a simple structure and that suitably reduces the number of parts, thus suitably reducing a volume and production cost.

In one preferred aspect, the present invention provides a battery pack. Preferably, the battery pack is configured to stack cell assemblies. Preferably, each cell assembly further includes a cell case. In further preferred embodiments, the cell case preferably includes windows in opposite surfaces thereof such that unit cells are suitably exposed, and recesses in opposite long lateral faces thereof such that the windows suitably communicate with the outside. Preferably, the windows and the recesses suitably define cooling passages between the stacked cell assemblies. In a further preferred embodiment, the cell case may suitably include at least one stud and hole on outer surfaces thereof, which are contact surfaces of the cell assembly. Preferably, the two neighboring cell assemblies may be suitably stacked by fitting the stud into the hole.

In another preferred embodiment, each cell assembly may preferably include first and second cases each including the windows and recesses, and suitably assembled so as to define an inner space, the unit cells suitably received in the inner space defined by the first and second cases, and a fixing window member fixing the unit cells to inner surfaces of the first and second cases under pressure.

In still another preferred embodiment, the fixing window member may have a frame structure with a window, be suitably interposed between the unit cells in the inner space defined by the first and second cases, and fix the unit cells to the first and second cases. Preferably, the fixing window member may expose intermediate parts of the unit cells through the window thereof, be suitably interposed between circumferences of the opposite unit cells, and suitably fix the circumferences of the opposite unit cells to the inner surfaces of the first and second cases under pressure.

In yet another preferred embodiment, the fixing window member may be suitably formed of a material having compressive deformability and elasticity, be compressed by protrusions formed on the inner surfaces of the first and second cases when the first and second cases are suitably assembled, and fix the circumferences of the opposite unit cells to the protrusions under pressure.

Preferably, the battery pack of the present invention has certain advantages described herein below.

In certain preferred embodiments of the present invention, when the cell assemblies are suitably stacked to form a module, cooling passages can be naturally defined in the module by the windows and the recesses of the cell case unlike a conventional battery pack, in which the cell assemblies must be spaced apart from each other.

In other preferred embodiments of the present invention, because it is not necessary to suitably separate the cell assemblies from each other, the battery pack of the present invention has a suitably reduced volume.

In other preferred embodiments of the present invention, unlike a conventional battery pack, in which the middle frame for reinforcing the structure must be suitably placed between the unit cells, thus increasing the volume of the battery pack and reducing the cooling efficiency, in the present invention the fixing window member suitably realizes the same function as a conventional middle frame that is interposed between the circumferences of the unit cells or the first and second cases of the cell case, so that the present invention does not suitably increase the volume of the battery pack.

In still other preferred embodiments of the present invention, the fixing window member of the present invention is preferably made of a material having compressive elastic deformability, so that it allows only the circumferences of the unit cells to be suitably fixed to the inner surfaces of the case under pressure, and is not interposed between the heat generating intermediate parts of the unit cells. Preferably, the present invention can suitably minimize the volume of the cell assembly and can suitably increase the cooling efficiency of the battery pack.

In certain preferred embodiments of the present invention, on forming the battery pack, suitably separate modularization is not carried out (i.e. the configuration of the unit module is not suitably required), so that effects such as process simplification, cost reduction, etc. can be produced, and so that the battery pack having higher energy density can be formed.

Other aspects and preferred embodiments of the invention are discussed infra.

It is understood that the term "vehicle" or "vehicular" or other similar terms as used herein is inclusive of motor vehicles in general, such as passenger automobiles including sports utility vehicles (SUV), buses, trucks, various commercial vehicles, watercraft including a variety of boats and ships, aircraft, and the like, and includes hybrid electric vehicles, electric vehicles, plug-in hybrid electric vehicles, hydrogen-powered vehicles and other alternative fuel vehicles (e.g. fuels derived from resources other than petroleum).

As referred to herein, a hybrid electric vehicle is a vehicle that has two or more sources of power, for example both gasoline-powered and electric-powered vehicles.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
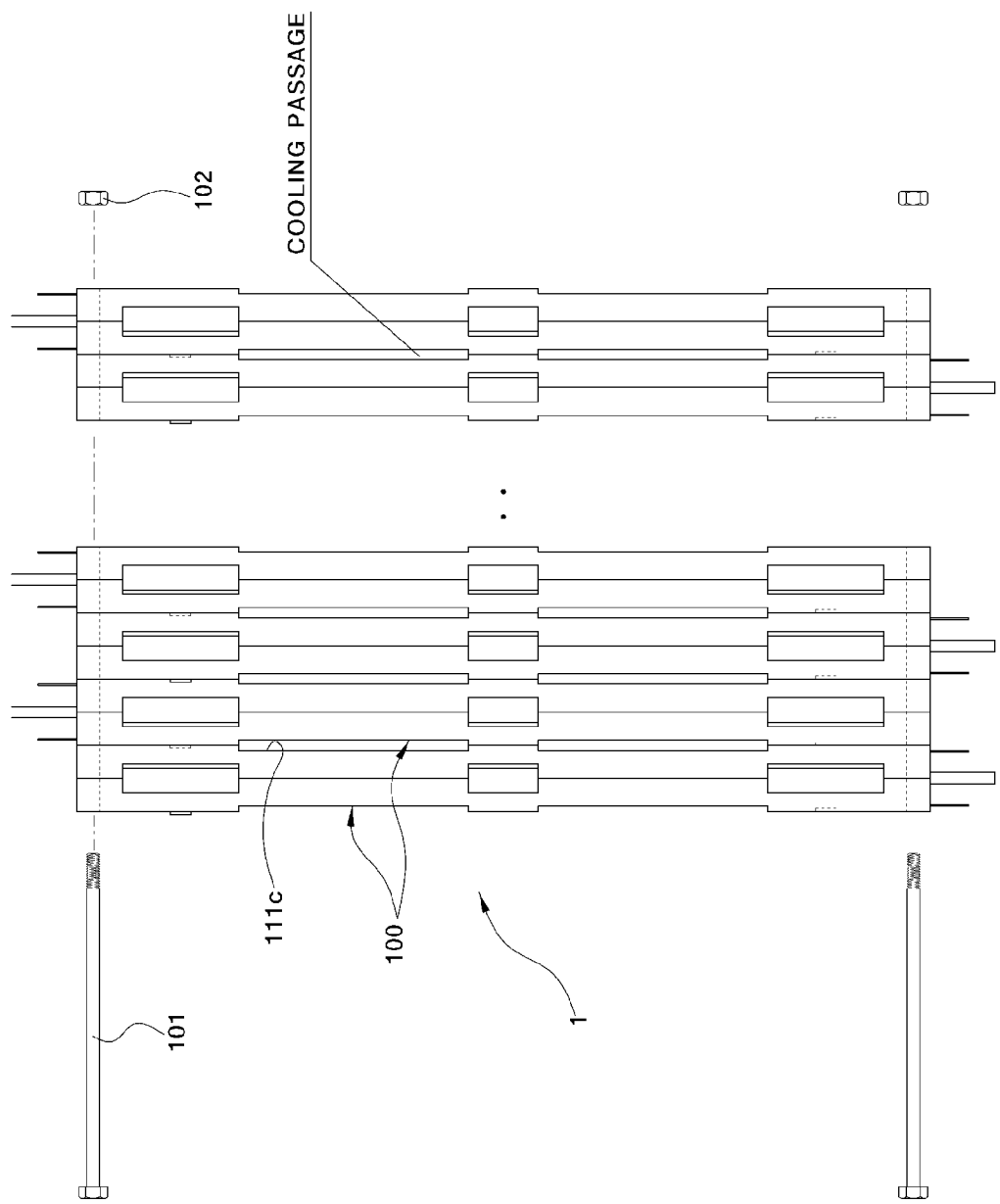
FIG. 1 is an exemplary side view illustrating a battery pack according to a preferred embodiment of the present invention, in which cooling passages are suitably defined between stacked cell assemblies.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

In a first aspect, the present invention features a battery pack comprising cell assemblies, wherein each cell assembly includes one or more cell cases.

In one embodiment, the cell assemblies are stacked.

In another embodiment, the cell case comprises windows in opposite surfaces thereof such that unit cells are exposed, and recesses in opposite long lateral faces thereof such that the windows communicate with an outside.

In a further embodiment, the windows and the recesses define cooling passages between the stacked cell assemblies.

In one embodiment, the cell case comprises at least one stud and hole on outer surfaces, and the two neighboring cell assemblies are staked by fitting the stud into the hole. In a related embodiment, the outer surfaces are contact surfaces of the cell assembly.

In another embodiment, each cell assembly further comprises first and second cases each including the windows and recesses, and assembled so as to define an inner space, unit cells received in the inner space defined by the first and second cases, and a fixing window member fixing the unit cells to inner surfaces of the first and second cases under pressure.

The invention also features a motor vehicle comprising the battery pack of any one of the above aspects.

Reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

In preferred embodiments, the present invention is directed to a battery pack, which may be suitably applied to a battery for supplying electricity to a variety of high-voltage parts, such as a drive motor, preferably installed in an environment friendly electric vehicle such as a fuel cell vehicle or a hybrid electric vehicle.

preferably, this battery is configured of chargeable/dischargeable secondary cells (unit cells), and may be used as a high-voltage battery (main battery) for suitably supplying necessary electricity to the high-voltage parts including the drive motor in the fuel cell vehicle or the hybrid vehicle.

In preferred embodiments of the present invention, each cell assembly constituting the battery pack preferably includes a cell case and a plurality of unit cells received in the cell case. Preferably, the cell assembly configured to assemble the unit cells in the cell case is not used independently, but is a basic unit suitably constituting the battery pack.

In further preferred embodiments, a conventional battery pack is suitably configured to stack two or more cell assemblies to form a unit module and then stack the unit module on another unit module such that they are suitably connected with each other. Accordingly, it is impossible to directly obtain the battery pack from the cell assemblies without the unit module. Further, according to certain preferred embodiments, it is necessary to suitably configure the unit module in such a manner that the cell assemblies are suitably separated to secure cooling passages (for cooling the cells) using separators.

Preferably, in preferred embodiments of the present invention, the battery pack may be directly obtained from the cell assemblies without the unit module. Accordingly, in exemplary preferred embodiments, a structure of the cell case is modified.

Preferably, the cooling passages are suitably required between the cell assembly and the other cell assembly. According to certain preferred embodiments of the present invention, in order to suitably secure the cooling passages (e.g. having an interval of 3 mm) between the cell assemblies, the unit module is suitably required to separate and fix the cell assemblies using a separating part. in certain preferred embodiments of the present invention, the structure of the cell case is suitably modified so as to be able to provide the cooling passages between the cells although the cell assembly is directly stacked on the other cell assembly. Accordingly, the unit module is not separately required, and the cooling passages can be suitably secured without increasing the volume. Preferably, the cooling passages can be suitably secured only by stacking the cell cases.

In the past, a middle frame has been provided to support a cell and another cell in one cell assembly, so that the entire cell assembly is structurally complicated (due to the cooling passages). This results in suitably increasing a volume of the entire cell assembly. In the present invention, the cell case is suitably configured not to be suitably increased in volume because a fixing window member having a simple structure and made of a soft material is preferably used.

The battery pack according to preferred embodiments of the present invention is described herein below with reference to the attached drawings.

FIG. 1 is a side view illustrating a battery pack according to a preferred exemplary embodiment of the present invention, in which cooling passages are suitably defined between stacked cell assemblies.

Figure 2:
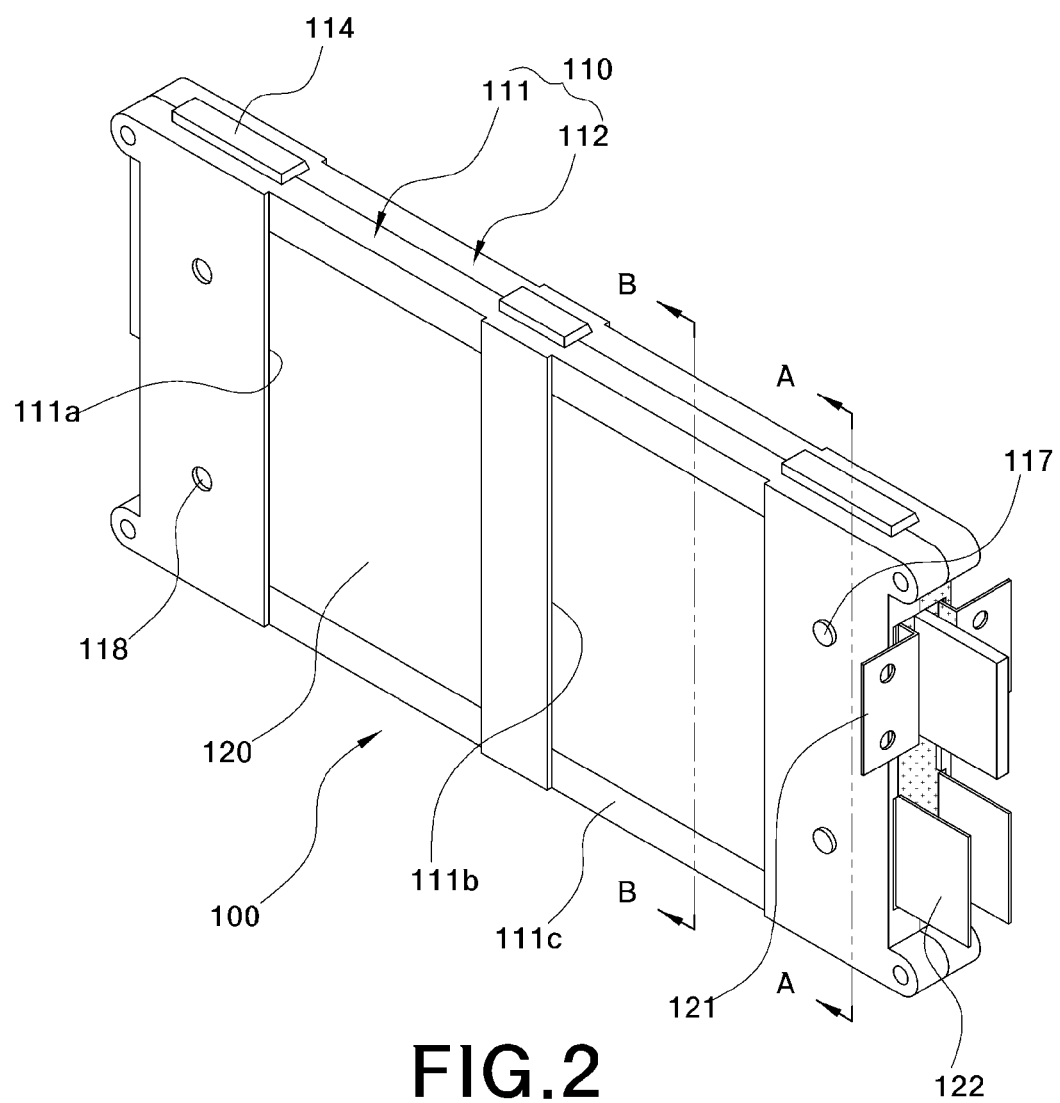
FIG. 2 is a perspective view illustrating a cell assembly as a basic unit constituting a battery pack according to another preferred embodiment of the present invention.
Figure 3:
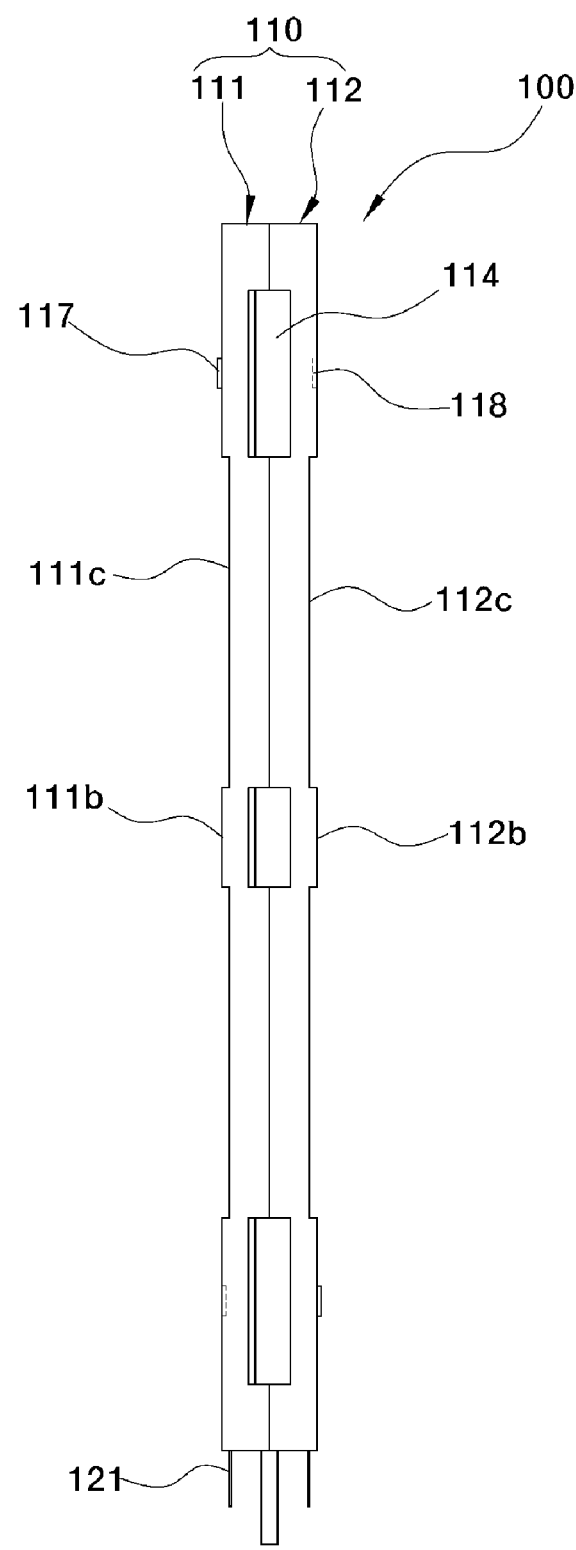
FIG. 3 is a side view illustrating the cell assembly of FIG. 2.
Figure 4:
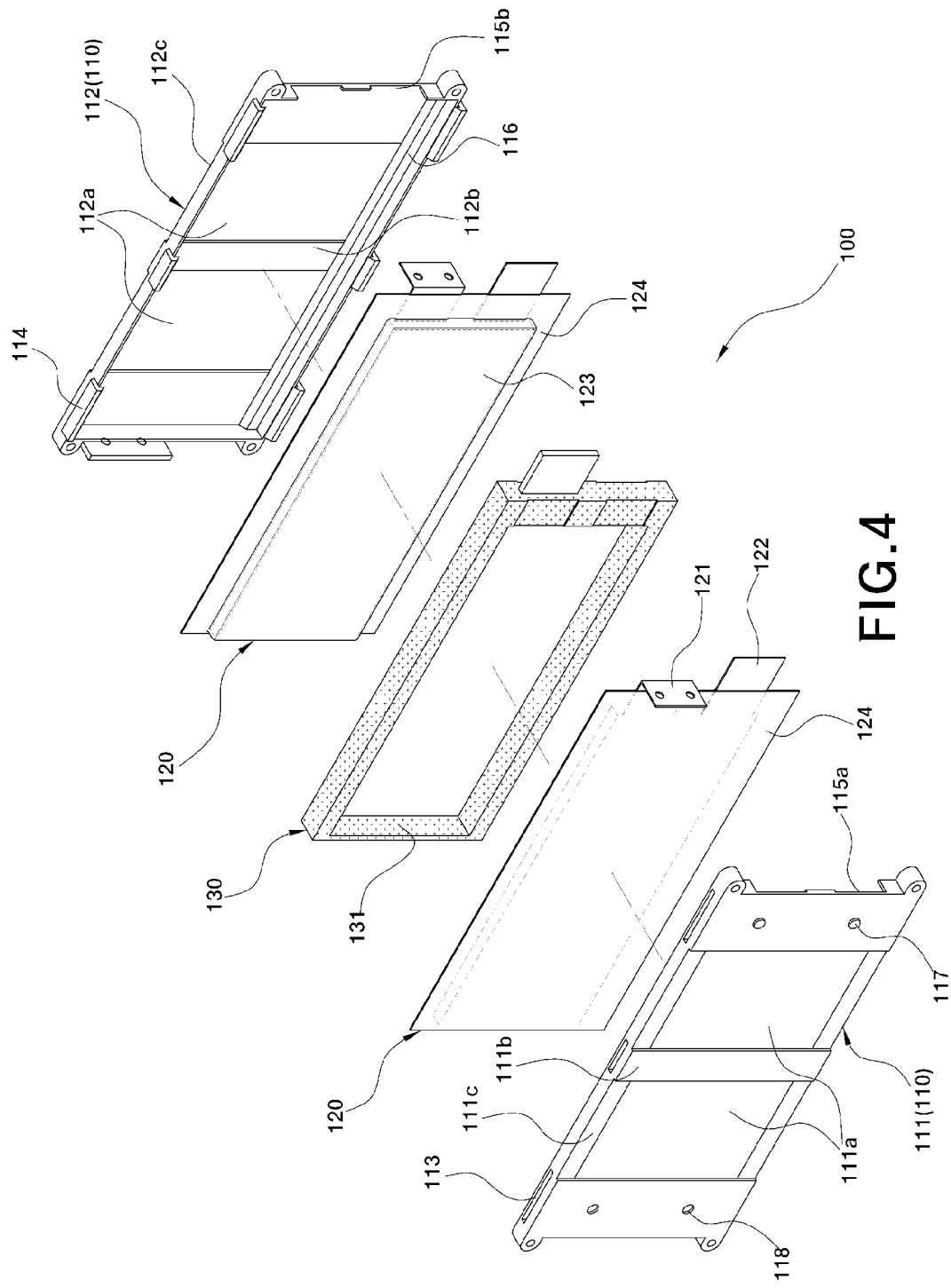
FIG. 4 is an exploded perspective view illustrating the cell assembly of FIG. 2.

FIG. 2 is a perspective view illustrating a cell assembly as a basic unit constituting a battery pack according to another exemplary embodiment of the present invention. FIG. 3 is a side view illustrating the cell assembly of FIG. 2. FIG. 4 is an exploded perspective view illustrating the cell assembly of FIG. 2.

Figure 5:
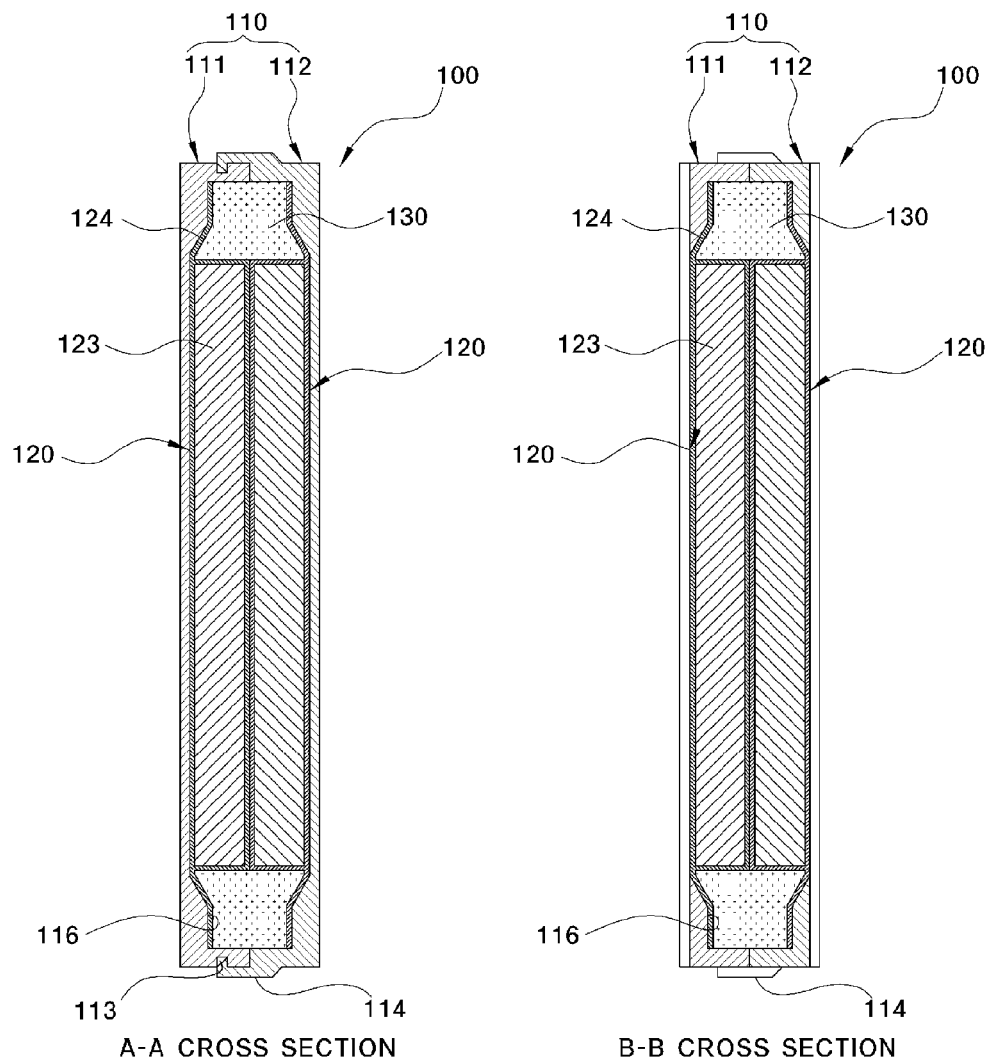
FIG. 5 is an exemplary cross-sectional view illustrating the state in which the cell assembly of FIG. 2 is assembled, particularly taken along lines A-A and B-B of FIG. 2.
Figure 6:
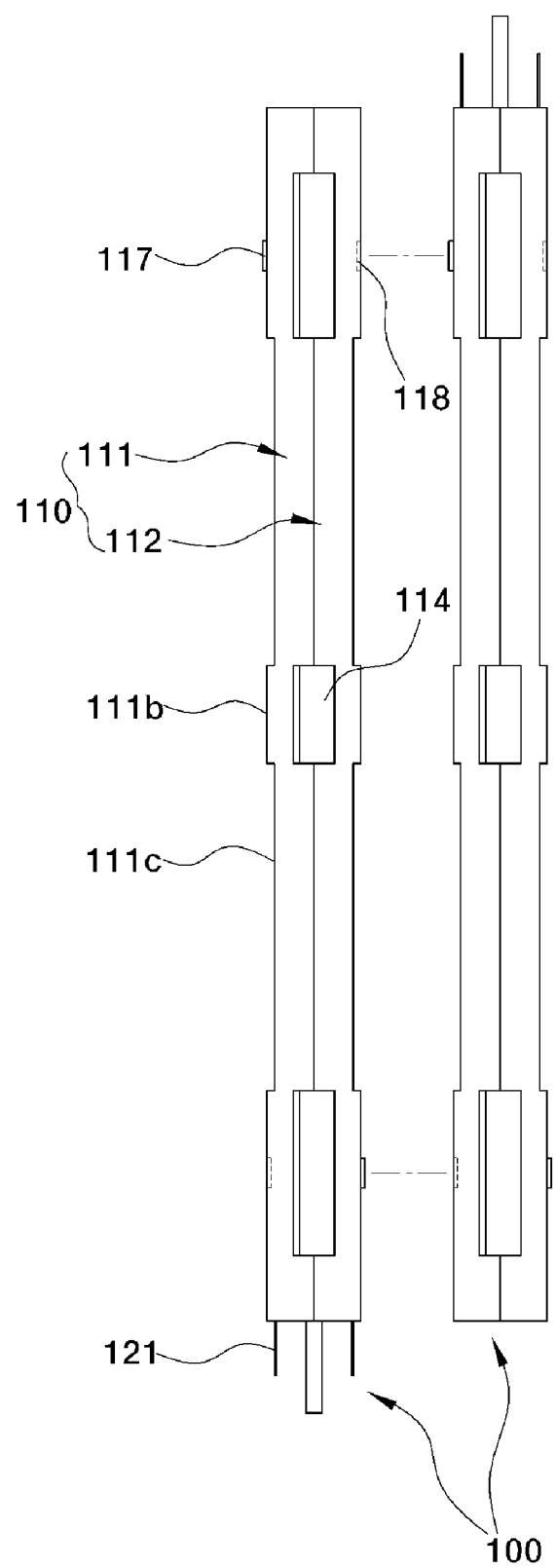
FIG. 6 is an exemplary side view illustrating the state in which two neighboring cell assemblies are stacked and coupled in a battery pack according to a preferred embodiment of the present invention.

In a further preferred embodiment, and as shown in FIG. 5, FIG. 5 is a cross-sectional view illustrating the state in which the cell assembly of FIG. 2 is suitably assembled, particularly taken along lines A-A and B-B of FIG. 2. FIG. 6 is a side view illustrating the state in which two neighboring cell assemblies are suitably stacked and suitably coupled in a battery pack according to another preferred embodiment of the present invention.

As illustrated in FIG. 1, for example, the battery pack 1 according to an embodiment of the present invention is suitably configured to stack and fasten a plurality of cell assemblies 100, each of which is a basic unit of the battery pack. Preferably, just stacking the cell assemblies 100 is suitable to automatically define cooling passages between the cell assemblies.

Accordingly, in certain preferred embodiments, and as illustrated in FIGS. 2 through 5, a cell case 110 of each cell assembly 100 is preferably provided with windows 111*a* and 112*a*, through which unit cells 120 are suitably exposed, on opposite surfaces thereof. Preferably, the cell case 110 is suitably provided with recesses 111*c* and 112*c* in opposite long lateral faces thereof such that the windows 111*a* and 112*a* communicate with the outside when the cell assemblies are stacked. Preferably, the windows and recesses serve as the cooling passages suitably defined between the stacked cell assemblies.

According to further preferred embodiments, and as illustrated in FIG. 4, each cell assembly 100 preferably includes first and second cases 111 and 112 having the windows 111*a* and 112*a* and the recesses 111*c* and 112*c* respectively, a pair of unit cells 120 suitably received in the first and second cases 111 and 112, and a fixing window member 130 fixing the unit cells 120 to inner surfaces of the first and second cases 111 and 112 under pressure.

Preferably, the first and second cases 111 and 112 are suitably assembled into the cell case 110 with the unit cells 120 received therein. In further exemplary embodiments, the first and second cases 111 and 112 are suitably assembled to define an inner space in which the unit cells 120 are received, and thus suitably form a structure for supporting the unit cells 120.

Preferably, the first and second cases 111 and 112 are suitably assembled with the unit cells 120 and the fixing window member 130 is suitably interposed therebetween. Accordingly, the first and second cases 111 and 112 are preferably provided with fastening means for fastening and fixing them at opposite short lateral faces thereof.

Preferably, in further preferred embodiments, the fastening means may preferably employ a hooking type for the purpose of convenient and easy assembly.

In further preferred embodiments, as illustrated, a plurality of fastening holes 113 are suitably formed along the opposite sides of the first case 111, and a plurality of hooks 114 are suitably formed along the opposite sides of the second case 112 so as to be hooked into the fastening holes of the first case 111. Preferably, when the first case 111 and the second case 112 are suitably assembled, the hooks 114 are hooked into the fastening holes 113, so that the two cases are fixed to each other.

In further preferred embodiments, the method of fastening the two cases may include various methods such as a method of fastening overlapping or corresponding portions using suitable fastening means such as screws or rivets, a method of forming recesses and protrusions in and on overlapping or corresponding portions, and fitting and fixing the protrusions into and to the recesses, a suitable clamping method using clamps, and so on. Further, in certain preferred embodiments, the method of fastening the two cases may preferably include a combination of them.

Preferably, the first case 111 and the second case 112 include the windows 111c and 112c capable of exposing the unit cells 120 mounted therein. Preferably, the windows 111c and 112c serve as vents for radiating heat generated from the unit cells 120 toward the outside.

According to further preferred embodiments, each of the windows 111c and 112c of the first and second cases 111 and 112 may be plural in number. As illustrated, the windows 111c or 112c may preferably be provided so as to be disposed on opposite sides centering a support 111b or 112b installed in the middle of the case 111 or 112.

Further, in other exemplary embodiments, the first and second cases 111 and 112 include the recesses 111c and 112c, through which air can flow, in the opposite long lateral faces thereof. Preferably, the recesses 111c and 112c define the cooling passages between the stacked cell assemblies 100 along the windows 111a and 112a.

More particularly, in certain exemplary embodiments, when the cell assemblies 100 assembled as in FIG. 1 are suitably stacked to form one battery pack 1, the windows 111a and 112a and the recesses 111c and 112c of the cases 111 and 112 define the cooling passages between the cell assembly 100 and the neighboring cell assembly, particularly between the unit cell 120 and the neighboring unit cell, so as to allow the air to be suitably circulated.

In further preferred embodiments, each unit cell 120 is provided with positive and negative terminals 121 and 122 of the anode and cathode, and the first or second case 111 or 112 is preferably provided with a terminal slot 115a or 115b, through which the positive and negative terminals 121 and 122 of the unit cell 120 can protrude to the outside, in one of the opposite short lateral faces thereof. Accordingly, when the two cases are suitably assembled, the terminal slots serve as holes, through each of which the positive and negative terminals of each unit cell suitably protrude to the outside.

Preferably, in the battery pack of the present invention, as the unit cell used for the cell assembly, a pouch type secondary cell sealing an electrolyte in a sheet may be used. Further, in certain preferred embodiments, any known secondary cell will do if it has the shape of a plate.

As described herein, the two terminals 121 and 122 of the anode and cathode protrude outwardly from each unit cell 120. Accordingly, when the first case 111 is suitably assembled with the second case 112, the two terminals 121 and 122 protrude to the outside through the holes serving as the terminal slots 115a and 115b.

Preferably, in order to connect in series the unit cells of the stacked cell assemblies of the battery pack, one 121 of the terminals of each unit cell 120 is suitably connected with the terminal of a counterpart electrode of the unit cell of the neighboring cell assembly, and the other 122 is suitably connected with the terminal of a counterpart electrode of the same unit cell of the neighboring cell assembly.

In further preferred embodiments, the fixing window member 130 is a member that suitably compresses circumferences 124 of the unit cells 120 against the inner surfaces of the first and second cases of the cell case 110, thereby stably and fixedly supporting the entire unit cells. Preferably, the fixing window member 130 is suitably formed of a frame structure having a window 131 so as to be able to fix only the circumferences 124 of the unit cells, exclusive of intermediate parts 123 where the electrolyte is sealed, to the inner surfaces of the first and second cases of the cell case 110 under pressure.

In certain exemplary embodiments of the present invention, the fixing window member 130 is preferably made of a form or rubber material having compressive deformability and elasticity so as to be able to reduce the entire volume of the cell case 110 to the maximum extent.

As described herein, the fixing window member 130 is formed of a soft material so as to be able to be deformed between the inner surface of the first case 111 and the inner surface of the second case 112 under pressure. In further preferred embodiments, the first and second cases 111 and 112, with which the circumferences 124 of the unit cells 120 are closely contacted by the fixing window member 130, are each suitably provided with protrusions 116, which compress the circumferences of the unit cells and the fixing window member, along opposite long lateral edges of the inner surfaces thereof.

Accordingly, when the fixing window member 130 is suitably formed of the soft material having compressive deformability, and when the protrusions 116 are suitably formed on the inner surfaces of the first and second cases 111 and 112, the following advantages are imparted.

Preferably, the fixing window member 130 is suitably interposed between the unit cells 120 in the inner space between the first case 111 and the second case 112, and suitably fixes the unit cells to the inner surfaces of the first and second cases.

In further preferred embodiments, the fixing window member 130 suitably exposes the intermediate part 123 of each unit cell 120 through the window 131, and is suitably interposed between the circumferences 124 of the unit cells. Accordingly, the fixing window member 130 is suitably fixed to the inner surfaces of the first and second cases 111 and 112 under pressure.

Preferably, as the fixing window member 130 having compressive deformability is used, the fixing window member 130 is suitably deformed by the protrusions 116 of the inner surfaces of the first and second cases 111 and 112 under pressure, and is simultaneously suitably compressed against the circumferences 124 of the unit cells 120 interposed between the first and second cases 111 and 112, so that the unit cells 120 can be fixedly supported in a more stable manner. Preferably, at this time, the compressed fixing window member 130 is in contact with only the circumferences 124 of the unit cells 120, so that the thickness of the cell assembly can be suitably reduced to the maximum extent.

According to further preferred embodiments, as has been previously reported, when the cell assembly is suitably formed by stacking an outer frame, a cell, a middle frame, another cell, and anther outer frame, preferably in that order, the thickness of the cell assembly reflects the thicknesses of all of the outer frames, the cells, and the middle frame.

Preferably, due to a structure in which each cell is simply placed between the outer frame and the middle frame, the thickness of the middle frame interposed between the cell and the other cell is suitably reflected on the entire thickness of the cell assembly. Accordingly, there is no alternative but to increase the thickness of the cell assembly.

Preferably, in the present invention, the fixing window member is preferably 130 made of a soft material and compresses and fixes only the circumferences 124 of the unit cells 120, the thickness of the fixing window member is preferably not reflected on the thickness of the cell assembly 100.

Accordingly, the cell assembly of the present invention can suitably exclude the thickness of the middle frame between the cell and the other cell, compared to the conventional cell assembly, so that the entire thickness of the cell assembly can be considerably reduced.

Preferably, in further exemplary embodiments, since the fixing window member 130 is suitably configured to fix the circumferences 124 of the unit cells 120 to the protrusions 116 of the inner surfaces of the first and second cases of the cell case 110 under pressure, the unit cells can be fixedly supported in a more stable manner.

Accordingly, two effects capable of fixedly and stably supporting the unit cells and reducing the thickness of the cell assembly can be suitably obtained at the same time.

According to further preferred embodiments and as illustrated in FIG. 6, when the cell assemblies 100 are suitably stacked, outer surfaces of the cell case 110, which are the contact surfaces of the cell assembly, more particularly outer surfaces of the first and second cases 111 and 112, are each preferably provided with at least one stud 117 and hole 118 such that the first and second cases 111 and 112 are coupled to the neighboring first and second cases 111 and 112.

Preferably, in further exemplary embodiments, a hole-stud fitting structure is suitably applied to the two neighboring stacked cell assemblies. Preferably, this structure allows the cell assemblies to be prevented from being individually displaced in a stacked state, and to be stably fixed and coupled in position.

Accordingly, in further preferred embodiments, the cell case 110 of one of the two neighboring cell assemblies 100 has the studs 117, and the cell case of the other cell assembly has the holes 118. Preferably, the studs 117 are suitably fitted into the holes 118, so that the stacked cell assemblies 100 can be kept stably assembled together.

According to further preferred embodiments, and as illustrated in FIG. 6, both the studs 117 and holes 118 may preferably be formed in outer surfaces of the first and second cases 111 and 112 contacted with the respective different cell assemblies. Preferably, when the cell assemblies are suitably stacked, the studs 117 and holes 118 of the neighboring cell assemblies 100 can be mutually coupled.

According to other further preferred embodiments, and referring to FIG. 1 for example, whenever the cell assemblies 100 having the same configuration are suitably stacked one by one, the neighboring cell assemblies are preferably assembled in a reverse direction. Accordingly, the studs 117 and the holes 118 serve to be oriented such that the cell assemblies can be alternately assembled in a reverse direction.

A process of assembling the cell assembly according to a preferred exemplary embodiment of the present invention is described.

In an exemplary embodiment, one of the unit cells 120 is preferably placed in the first case 111, and then the fixing window member 130 is placed on the unit cell (see FIG. 4).

Preferably, the fixing window member 130 is placed on the circumference 124 of the unit cell 120. According to further preferred embodiments, the intermediate part 123 of the unit cell 120 filled with an electrolyte is suitably exposed through the windows 111a of the first case 111 and the window 131 of the fixing window member 130.

According to further preferred embodiments, the other unit cell 120 is preferably placed on the fixing window member 130, and then is suitably covered with the second case 112. Preferably, the second case 112 is suitably fastened to the first case 111 using the hooks 114. Accordingly, the terminals 121 and 122 of each unit cell 120 are suitably exposed to the outside through the holes serving as the terminal slots 115a and 115b.

Preferably, in the cell assembly 100 assembled in this way, the intermediate parts of the unit cells 120 are suitably exposed through the windows 111a and 112a of the first and second cases 111 and 112.

Preferably, in the cell assembly 100, the pair of unit cells 120 are suitably supported in the first and second cases 111 and 112 under pressure by the fixing window member 130. This structure has is described herein.

In preferred embodiments of the present invention, the assembly of the battery pack requires a process of stacking and fastening the numerous cell assemblies 100 without forming any unit module in the middle. Preferably, when stacked, the cell assemblies 100 are suitably fastened together using fastening means including a square head machine or double-ended bolt 101 and nut 102. In certain preferred embodiments, the long square head machine bolt 101 passes through the cell assemblies 100.

Preferably, in this state where the cell assemblies 100 are suitably stacked, the windows 111a and 112a and recesses 111c and 112c of the first and second cases 111 and 112 suitably define the cooling passages between the cell assemblies. Accordingly, the structure of this cell case is improved, so that the cooling passages can be secured preferably by stacking the cell assemblies.

According to certain preferred embodiments of the present invention, when the cell assemblies are suitably stacked as a module, the cooling passages can be automatically secured by the windows and recesses of the first and second cases of the cell case without separating the cell assemblies from each other.

In further related embodiments, since the cell assemblies are not required to be suitably spaced apart from each other, the entire volume of the battery pack can be reduced.

Furthermore, it has been previously described that a middle frame for maintaining rigidity is suitably interposed between a unit cell and another unit cell, so that cooling efficiency is reduced. In preferred embodiments of the present invention, the fixing window member having the same function as the middle frame is suitably interposed between the circumferences of the unit cells or the first and second cases of the cell case, so that the volume of the cell assembly is not additionally increased. Preferably, in further related embodiments, the fixing window member is made of a material having compressive and elastic deformability, and that preferably allows only the circumferences of the unit cells to be suitably compressed against and fixed to the inner surfaces of the cell case, and is not suitably interposed between the intermediate parts of the unit cells from which heat is generated, so that the volume of the cell assembly can be suitably minimized, and so that the cooling efficiency can be suitably improved.

According to further preferred embodiments, on forming the battery pack, separate modularization is preferably not carried out (i.e. the configuration of the unit module is not required), so that effects such as process simplification, cost reduction, etc. can be produced, and so that the battery pack having higher energy density can preferably be formed.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A battery pack in which:
cell assemblies are stacked;
each cell assembly includes a cell case;
each cell case includes windows in opposite surfaces thereof such that unit cells are exposed, and recesses in opposite long lateral faces thereof such that the windows communicate with an outside; and
the windows and the recesses define cooling passages between the stacked cell assemblies,
wherein each cell assembly comprises:
first and second cases each including the windows and recesses, and assembled so as to define an inner space;
unit cells received in the inner space defined by the first and second cases; and
wherein a fixing window member fixing the unit cells to inner surfaces of the first and second cases under pressure, and
the fixing window member comprises a frame structure with a window, is interposed between the unit cells in the inner space defined by the first and second cases, and fixes the unit cells to the first and second cases, and
exposes intermediate parts of the unit cells through the window thereof, is interposed between circumferences of the opposite unit cells, and fixes the circumferences of opposite unit cells to the inner surfaces of the first and second cases under pressure.

2. The battery pack of claim 1, wherein each cell case includes at least one stud and hole on outer surfaces thereof, which are contact surfaces of each cell assembly, and two neighboring cell assemblies are staked by fitting the stud into the hole.

3. The battery pack of claim 1, wherein the fixing window member
is formed of a material having compressive deformability and elasticity,
is compressed by protrusions formed on the inner surfaces of the first and second cases when the first and second cases are assembled, and
fixes the circumferences of the opposite unit cells against and to the protrusions under pressure.

* * * * *